Aug. 25, 1964   H. HAYEK ETAL   3,146,128
COATING APPARATUS

Original Filed April 18, 1960   2 Sheets-Sheet 1

INVENTORS
HERMANN HAYEK
JOSEF ZEMANN
JOHANNES EISENWIENER
HERBERT RENNER
BY
ATTORNEYS

INVENTORS
HERMANN HAYEK
JOSEF ZEMANN
JOHANNES EISENWIENER
HERBERT RENNER

United States Patent Office 3,146,128
Patented Aug. 25, 1964

3,146,128
COATING APPARATUS
Hermann Hayek, Josef Zemann, Johannes Eisenwiener, and Herbert Renner, all of Guntramsdorf, near Vienna, Austria, assignors to Peter Stoll, a corporation of Austria
Original application Apr. 18, 1960, Ser. No. 23,019. Divided and this application Sept. 21, 1960, Ser. No. 57,422
2 Claims. (Cl. 118—64)

The present invention relates to apparatus for using water-soluble and water-dispersible coating agents as well as of combinations of these two, in fact to all water-dilutable coating agents, for coating articles in the coater.

The flow-coater process is known in the art per se (see, for example, Industrie-Lackier-Betrieb, 26th Year, pages 320 ff., 1958). However, water-dilutable coating agents have previously not been used in a coating process for various reasons. For example, previously, so-called curtains and tears were formed and the coated objects had such uneven surfaces that they were not very well suitable for further use, especially for applying lacquer covers thereto. Other problems encountered were foam formation, poor stability of the water-diluted coating agents over long periods of operation; tendency toward crater formation on the lacquered objects; the uncertainty whether the water vapor produced in the drain tunnel of the flow-coater would behave as favorably as the solvent atmosphere which is developed in the drain tunnel upon evaporation of the organic solvents in conventional lacquers, etc.

An object of our invention is therefore to provide an apparatus for applying a uniform coat of a water dilutable coating agent to an article in a coater, wherein the coat is free from surface defects.

Further objects of our invention are to overcome the problems enumerated above in the use of water dilutable coatings in a coater.

These and other objects of our invention will become apparent as the description thereof proceeds.

This application is a division of our co-pending application Serial No. 23,019, filed April 18, 1960, "Process for Coating Objects in a Flow-Coater," in which the process is more fully described.

Figure 1:
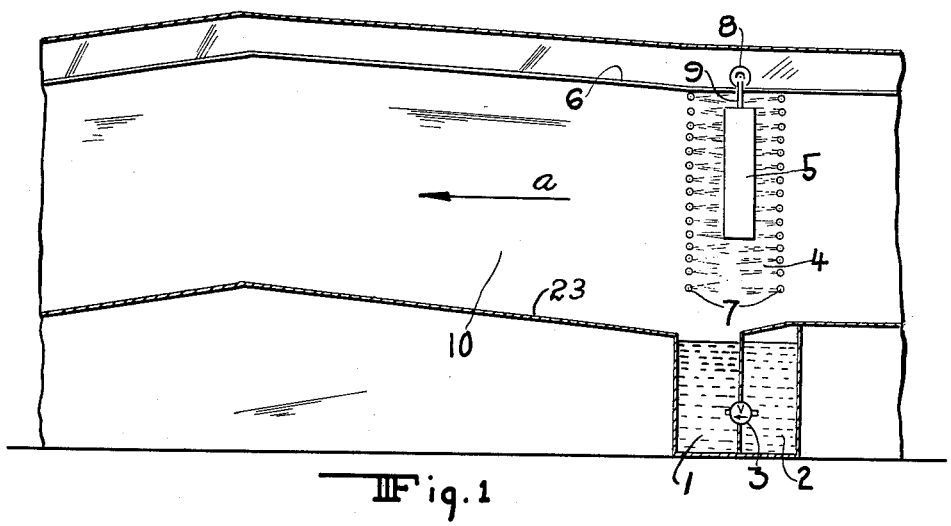

Referring to the drawings which illustrate embodiments for carrying out our invention, FIGURE 1 illustrates a coating apparatus in elevation cross-section, showing spraying and drying sections.

Figure 2:
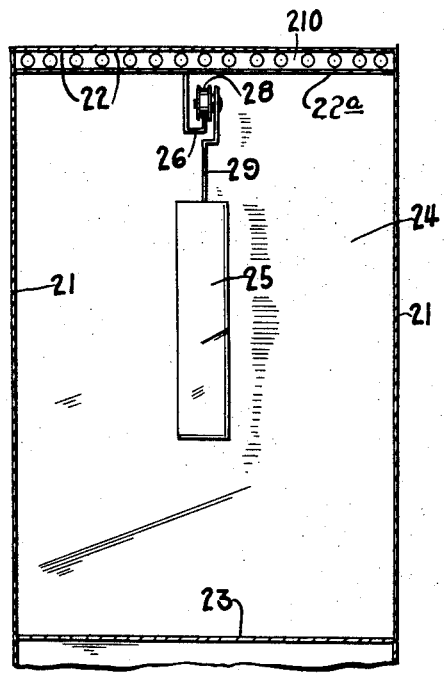
Figure 3:
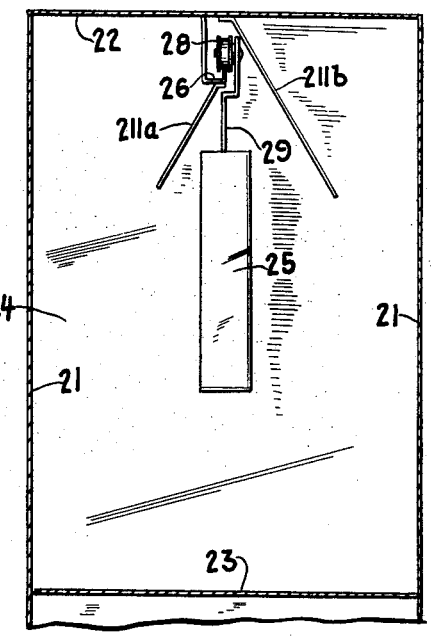
Figure 4:
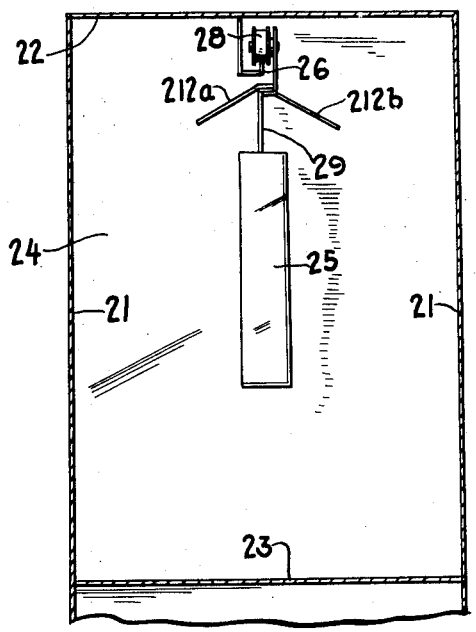

FIGURES 2, 3 and 4 illustrate the coater in end elevation and show variations of a means to prevent marring of the coated article in the drying chamber by condensed droplets of the sprayed coating mixture.

In the drawings, FIG. 1 is a schematic representation of the coater. 1 is a container for the coating agent, 2 is the container for the additive composition which may be water or water and solvent and 3 is the automatically controlled valve, for example a controlled viscosity measuring device which is not shown, by means of which the additive composition for maintaining uniform viscosity as discussed above, is added from container 2 to the coating composition in container 1 during the entire operation. 4 is a spray chamber with nozzles 7, in which the object 5 to be coated is introduced into the spray chamber by means of a transport device 9, preferably a chain attached to a roller 8 or other sliding device, which glides over a rail 6. The objects 5 are treated with the coating composition and are transported into the tunnel-like chamber 10 (called drain-tunnel) in the direction of arrow a. Beyond the drain tunnel a drying tunnel 10a is provided. In the drain chamber the excess coating composition drips from the treated objects, whereas the coating layer adhering to the objects dries. The drying can be regulated by drawing air through the drain tunnel. The excess of coating composition introduced into the spray chamber as well as the coating composition dripping from the objects in chamber 10 falls onto drain surfaces 23 and runs back into container 1, so that the coating composition is constantly cycled. The coating composition is cycled from tank 1 to nozzles 7 by conduit means not shown. The apparatus of FIG. 1 is mainly diagrammatic to illustrate the various necessary elements and their functions. It will be understood that the solvent composition tank could be located differently and that other modifications are possible.

We have found that when working in accordance with the coating process of our co-pending application S.N. 23,019, large quantities of water and solvent which are present in the coating composition continuously evaporate in the drain tunnel. We have now found that it is very detrimental that the water or solvent vapor condenses on the walls of the drain tunnel because the condensate which settles on the ceiling of the drain tunnel, drips down on the passing objects which have been coated with the coating composition and have not yet dried causing damage to the coating composition surface film. These objections can be overcome by the use of apparatus of the type illustrated in FIGS. 2, 3 and 4.

FIG. 2 shows a drain tunnel with a heatable ceiling; FIG. 3 shows a stationary arrangement of cover draining means in the interior of the tunnel; and FIG. 4 shows an arrangement of cover draining means attached to the transport means for the objects which have been coated with a coating composition film.

In FIG. 2, 21 represents the walls, 22 the ceiling and 23 the floor of the drain tunnel 24 in cross section. 26 is the transport rail, 28 a wheel of the transport means 29 to which the object 25 to be coated is attached to pass it through the coater. Ceiling 22 in FIG. 2 is provided with cover means 22a heating coils 210 to make it heatable.

In FIG. 3 the drainage means are in the form of flat pieces of sheet iron 211a and 211b, sheet 211a being attached to the transport rail 26 and the other sheet 211b being fastened to ceiling 22 of the drain tunnel 24. In FIG. 4 a protective device 212a and 212b is provided on the transport means 29 which may be shaped in such a way as to be inclined toward all sides, if necessary, and may assume various forms when viewed from the top. The width of the protective pieces of sheet iron must be such that they provide adequate protection of the objects against dripping of condensate from the ceiling of the drain tunnel or from any parts of the apparatus mounted immediately below the ceiling. The invention, however, is not limited to the embodiments shown in the drawing.

While we have set forth certain specific embodiments and preferred modes of practice of our invention, it will be understood that this is solely to illustrate the invention and enable persons skilled in the art to better understand and practice the invention. Various changes and modifications may be made in the invention without departing from the spirit of the disclosure and the scope of the appended claims.

We claim:

1. In a coating apparatus for coating objects with water dilutable coating agents comprising spraying and drying sections and means for conveying objects through said sections, cover means above said conveying means extending the length of said drying chamber to prevent droplets of sprayed coating agent condensing above the coated objects from falling on the freshly coated surface of said object in said drying chamber.

2. In a coating apparatus for coating objects with water dilutable coating agents comprising spraying and drying sections, track means along the ceiling of said sections, movable means to travel along said track means, and cover means attached to said movable means above said objects to prevent droplets of sprayed coating agent condensed on the ceiling of said drying section from falling on the freshly coated surface of said object in said drying chamber.

References Cited in the file of this patent

UNITED STATES PATENTS

| | | |
|---|---|---|
| 1,869,422 | Harris | Aug. 2, 1932 |
| 2,396,946 | Grupe | Mar. 19, 1946 |
| 2,552,612 | Adams | May 15, 1951 |
| 2,661,310 | Page et al. | Dec. 1, 1953 |
| 2,702,758 | Uhlig et al. | Feb. 22, 1955 |
| 2,760,884 | Graf | Aug. 28, 1956 |
| 2,812,269 | Ransburg | Nov. 5, 1957 |
| 2,848,353 | Norris | Aug. 19, 1958 |
| 2,887,087 | Jones | May 19, 1959 |
| 3,008,834 | Wallis | Nov. 14, 1961 |
| 3,061,446 | Norman et al. | Oct. 3, 1962 |
| 3,067,060 | Glaus | Dec. 4, 1962 |

FOREIGN PATENTS

| | | |
|---|---|---|
| 136,080 | Australia | Jan. 26, 1950 |